United States Patent [19]

Vranish et al.

[11] Patent Number: 4,598,595

[45] Date of Patent: Jul. 8, 1986

[54] TORQUE GAUGE FOR APPLICATIONS INCLUDING ROBOTICS

[75] Inventors: John M. Vranish, Crofton; Eugene Mitchell, Annapolis; Robert DeMoyer, Arnold, all of Md.

[73] Assignee: The United States of America as represented by the Secretary of the Navy, Washington, D.C.

[21] Appl. No.: 724,733

[22] Filed: Apr. 18, 1985

[51] Int. Cl.$^4$ .......................... G01L 3/00; G01B 7/24
[52] U.S. Cl. ....................... 73/862.08; 73/DIG. 2; 324/209; 901/46
[58] Field of Search ............... 73/779, 862.08, 862.33, 73/862.36, 862.69, DIG. 2; 324/209; 901/33, 34, 46

[56] References Cited

U.S. PATENT DOCUMENTS

| | | |
|---|---|---|
| 1,666,680 | 4/1928 | Buckley . |
| 1,906,551 | 5/1933 | DeForest .......................... 73/779 |
| 2,461,635 | 2/1949 | Feller ............................. 73/DIG. 2 |
| 2,557,393 | 6/1951 | Rifenbergh . |
| 2,749,746 | 6/1956 | Wright . |
| 2,895,331 | 7/1959 | Dahle . |
| 3,011,340 | 12/1961 | Dahle . |
| 3,042,858 | 7/1962 | Dubsky et al. . |
| 3,046,781 | 7/1962 | Pratt . |
| 3,168,830 | 2/1965 | Chass ............................. 73/DIG. 2 |
| 3,258,962 | 7/1966 | Dahle . |
| 3,340,729 | 9/1967 | Scoppe . |
| 3,440,871 | 4/1969 | Vissnia ............................. 73/862.69 |
| 3,453,876 | 7/1969 | Radus . |
| 3,861,206 | 1/1975 | Kawafune et al. . |
| 4,015,477 | 4/1977 | Sitkewich ............................. 73/722 |
| 4,030,346 | 6/1977 | Dahle et al. . |
| 4,039,935 | 8/1977 | Wilson . |
| 4,048,851 | 9/1977 | Portier . |
| 4,088,013 | 5/1978 | Dahle et al. . |
| 4,106,334 | 8/1978 | Studtmann . |
| 4,135,391 | 1/1979 | Dahle . |
| 4,374,665 | 2/1983 | Koon . |
| 4,414,855 | 11/1983 | Iwasaki . |

OTHER PUBLICATIONS

J. M. Vranish et al., "Outstanding Potential Shown by Magnetoelastic Force Feedback Sensors for Robots", Sensor Review, Oct. 1982, pp. 200–205.

*Primary Examiner*—Charles A. Ruehl
*Attorney, Agent, or Firm*—Kenneth E. Walden; Frederick A. Wein

[57] ABSTRACT

A torque gauge using magnetoelastic ribbons is presented wherein changes in the magnetic characteristics of these ribbons are detectable in a push-pull mode for determining torque forces applied to the ribbons. Respective tensile and compressive forces applied to the ribbons cause a change in the magnetic qualities of the ribbons and of the inductance of coils wound about the ribbons with the change of inductance being a measure of the torque forces applied to the input of the device.

11 Claims, 4 Drawing Figures

TORQUE GAUGE FOR APPLICATIONS INCLUDING ROBOTICS

BACKGROUND OF THE INVENTION

The present invention relates to a torque gauge, and more particularly to a gauge using magnetoelastic properties of materials for sensing torque particularly experienced by the mechanical hand of a robot.

It is well known that various magnetic properties of magnetic materials changed due to applied stress. In particular, the permeability of the magnetic material tends to increase due to tensile stress and tends to decrease due to compressive stress. Thus, stress can be measured taking advantage of ferromagnetic substances exhibiting this property.

Electrical signals can be converted into a mechanical displacement or the reverse, using the magnetostrictive effect by placing a magnetostrictive material in a magnetic field, i.e., a change in the physical dimensions of the magnetostrictive material causes a change in the magnetic state of the magnetostrictive material. This is called the Villari effect.

In general, a good magnetostrictive material has high electrical resistivity, low magnetic anisotropy, large magnetization, and large isotropic magnetostriction. All crystalline materials have some magnetic anisotropy as well as magnetostriction which is not perfectly isotropic. The largest room temperature magnetostrictive strains are exhibited by rare earth-iron intermetallic compounds. However, these and similar alloys also have the problem that the magnetostrictive effect is very anistrophic with large strains occurring along the (III) direction and very small ones along the (I00) direction. To produce a large magnetostrictive effect in such an alloy with very low applied magnetic fields requires using either a single crystal or a highly texture polycrystalline sample. Generally, alloys which do not contain rare earth elements have much smaller magnetostrictive strains and must employ special combinations of rare earths to reduce magnetic and isotrophy.

Amorphous magnetic alloys inherently have low isotrophy and thus are well suited for such an application. Amorphous magnetic alloys can be prepared by several methods, among the easiest are coevaporation or sputtering onto cold substrates. Usually some method involving rapid quenching of the melt is necessary.

Towards this end, amphorous ribbons recently developed are particularly applicable to exhibit the Villari effect. The permeability of the material to be measured varies in dependence on the strain of the material to be measured. Accordingly, the variation of the permeability of the material to be measured can be detected as the variation of magnetic flux density upon application of a magnetic field to the material to be measured. The magnetic material can be made from a magnetic material which is manufactured by quenching from a liquid phase and then formed as a thin sheet. The materials magnetically exhibit ferromagnetism and have a high level of magnetic saturation, high permeability of greater than $10^3$ and a low level of coercive force, less than 1.0 (Oe) while mechanically exhibit a high break strength, excellent resiliency and stability, and have small changes of magnetic characteristic under temperature variations.

With an applied magnetic field, the change in permeability in a magnetic layer on the surface is sensed by one or more pick-up coils located adjacent to the magnetic material. The inductance of the coil is directly proportional to the permeability of the core, the square of the radius of the coil, and inversely proportional to the length of the coil. Thus, for a given pick-up coil, the inductance of the coil is directly proportional to the permeability of the core material located within the coil. Since the permeability of a magnetic material chosen is directly proportional to the stress applied to the material, the inductance of a coil surrounding a magnetic material is directly proportional to the stress applied to the magnetic material coil. The inductance of the pick-up coils is determined by means of an electronic processor coupled to the coils. This structure provides for the sensing of small amounts of torque in a small and rugged configuration.

There is a increasing need for work to be done by automation. With robots being used in increasing numbers for assembly line work and in hazardous working environments such as with explosives, radioactive materials, and chemical processes, it is necessary for the robot to be provided with tactile sensing.

Accordingly, it is desirable to provide a torque measuring apparatus which is very sensitive to small amounts of torque and for that measuring apparatus to be providable in a small and rugged configuration which can be utilized in the hand of a robot.

OBJECTS OF THE INVENTION

Accordingly, it is an object of the present invention to provide a torque sensing apparatus having high sensitivity in a small size.

It is another object of the present invention to provide a torque measuring apparatus using a magnetoelastic sensor coupled with sensing coils for determining forces applied to a torque receiving member.

Further objects and advantages of the present invention will become apparent as the following description proceeds in the features of novelty characterizing the invention will be pointed out with particularity in the claims annexed to and forming a part of this specification.

SUMMARY OF THE PRESENT INVENTION

Briefly, the present invention relates to an apparatus for measuring torque forces. A pair of elongated magnetoelastic ribbon portions are joined at ends thereof to each other with the other ends secured to a stationary member. The magnetic qualities of the magnetoelastic ribbons are changeable in correlation to compressive and tensile forces applied to the ribbons along their length with the respective applied tensile and compressive stress forces changing the values of the magnetic characteristics of the respective magnetoelastic ribbon portions. A first coil is wound about the respective magnetoelastic portion for developing a magnetic field which penetrates the respective portion of the magnetoelastic ribbon and interacts with the ribbon. A second coil is wound about the respective portion of the magnetoelastic ribbon for detecting changes of values of the magnetic characteristics of the respective magnetoelastic ribbon portion. In particular, the inductance of the first and second coils are changed with the changing of the magnetoelastic magnetic characteristics. Additionally, the transformer coupling coefficient between the two coils is dependent upon inductance and is changed thereby. Further, the leakage inductance of the transformer formed between the two coils is changed. The changes of inductance, coupling, and linkage, manifest themselves singly or in combination at the output of the second coil and can be detected and measured by appropriate electronic circuitry. In the exemplary embodiment, one ribbon portion has applied to it a compressive force and the other ribbon portion has applied to it a tensile force such that the magnetic characteristics are changed in opposite directions thus giving an amplified or push-pull change in characteristic when the ribbon portions are prestressed to a preselected value between the extremes of permanent ribbon strain i.e., within the linear portion of the stress-strain curve for the material such that the Young's modulus still applies, and above zero stress. In this manner, the linearity of the strain gauge is improved.

DESCRIPTION OF THE DRAWINGS

For better understanding of the present invention reference may be had to the accompanying drawings wherein.

DETAILED DESCRIPTION OF THE PREFERRED EMBODIMENT

Before proceeding with discussion of the structure, the magnetic materials involved will be discussed. There have been recently important breakthroughs in the state of the art in amorphous ribbon technology. In the present embodiment, the composition of the amorphous ribbon is $Fe_{70}$ $Co_{10}$, $B_{20}$ (and small amounts of silicon and cobalt).

Magnetoelastic amorphous ribbons are first treated so that each of their internal magnetic domains line up with its net magnetic moment perpendicular to the long axis of the material. At the same time, the net magnetic moment of each domain is pointed in the direction opposite to that of its neighbor. This arrangement leaves the material with a net magnetic moment of zero, thus reducing spurious effects and increasing the material sensitivity. As the ribbon is stretched by an external force, the net magnetic moment of each domain rotates towards the ribbon axis and distance which is linearly proportional to the exciting force. The additive effect of all these rotating magnetic moments is that the total B field of the ribbon rotates toward its longitudinal axis in a manner linearly proportional to the external force. This effect is known as the Villari effect previously discussed.

Figure 1:
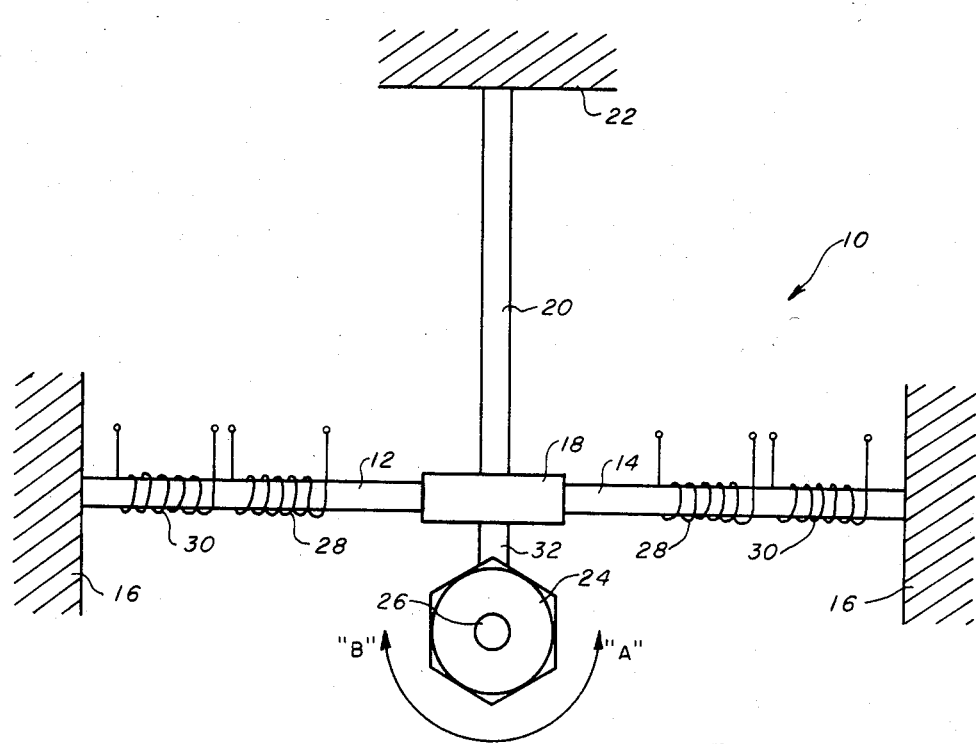
FIG. 1 is a representative drawing showing principles of the present invention.

Referring now to FIG. 1 there is shown a representative diagram of a torque sensor of the present invention. The torque sensor, generally designated 10, has a pair of magnetoelastic ribbons, 12 and 14 each having one end connnected to a stationary member 16. The other ends of the respective magnetoelastic ribbons 12, 14 are connected together at a coupling member 18. A center return spring 20 is connected at one end to the coupling member 18 and is cantilever secured at the other end to stationary member 22 which can be unitary with members 16. The torque is transmittable to the coupling member 18 and then to the magnetoelastic ribbons 12, 14 through a torque receiving member 24 which can be applied in a rotary direction, as counterclockwise as shown by the arrow "A" or clockwise as shown by arrow "B".

It should be noted that the magnetoelastic ribbons 12 and 14 can be a singular ribbon which is attached at some point, typically the mid-point but could be any non-center point along the length of the ribbon by coupling 18. Additionally, return spring 20 can be configured as a coil. Torque receiving means 24 is typically be connected to a shaft 26 at right angles to the plane of the paper for receiving applied torque. Additionally, the centering spring 20 could be wound around said shaft 26 for centering the mechanism.

The magnetoelastic ribbon portions 12, 14 are each magnetically coupled to a respective input coil 28 and an output coil 30 for inducing a magnetic field in the ribbon portions 12, 14 by coil 28 and sensing the change of magnetic characteristic of the respective ribbon portion at coil 30 upon transmission to the ribbon portions of a compressive or tensile force due to torque applied to shaft 26. An electronical circuitry for such input and output will be discussed more completely hereinafter.

It is desirable, but not necessary, that the magnetoelastic ribbon portions 12 and 14 be mounted and secured in a prestressed condition, the exemplary embodiment being 1000 psi, in order to improve the magnetoelastic linearity range of the ribbons. With a torque input in the direction of the arrow "A" at shaft 26 which in turn is coupled by receiving means 24 through a portion 32 of spring 20 to the coupling member 18, ribbon portion 14 will be stressed under tension in that coupling 18 will be moved towards ribbon portion 12 which in a like manner will receive a compressive force. A sinsoidal input signal is provided at the input terminals of coils 28 which through the windings around the ribbon generates a B field in the ribbon which varies according to the B-H curve of the material. As the B field of the ribbon varies according to the B-H curve, the inductance of coils 28 and 30 change and additionally the coupling coefficient between coils 28 and 30 which have a transformer action between them is also changed. Even though a transformer action can occur depending upon the proximity and coupling between the two coils and the leakage inductance between the two coils 28, 30, in the exemplary embodiment, only the change of inductance of the ribbon portions 12, 14 within the respective coils 30 is utilized in sensing the magnitude of the applied torque. It should be noted that the change of permeability of the ribbon material within coil 28 can also affect the magnetic field generated by coil 28 thus amplifying the effect on the magnetic coupling between coil 28 and the ribbon. In a similar manner torque applied in the direction of arrow "B" will cause a compressive force to be applied to ribbon portion 14 and a tensile force applied to ribbon 12. As the sinsoidal input flux oscillates through the windings wound around the respective ribbon portions 12, 14 the "B" field in the ribbon varies according to the B-H curve. As the "B" field in the ribbon moves along the B-H curve, the output signal is generated in the output windings, the output voltage being $V_o = N\ A\ d\overline{B}/dt = N\ d\phi/dt$, assuming that there is no skin effect which is valid for a low frequency of approximately 10 kHz is used in the exemplary embodiment. Thus, the output voltage is a function of the shape of the B-H curve. However, when a force stretches or compresses the ribbon, the B-H curve change and this in turn means that the dB/dt changes as a function of force. The net result is that the voltage before the application force stress plus or minus the voltage after applied stress is a measure of the force of the torque applied.

Figure 2:
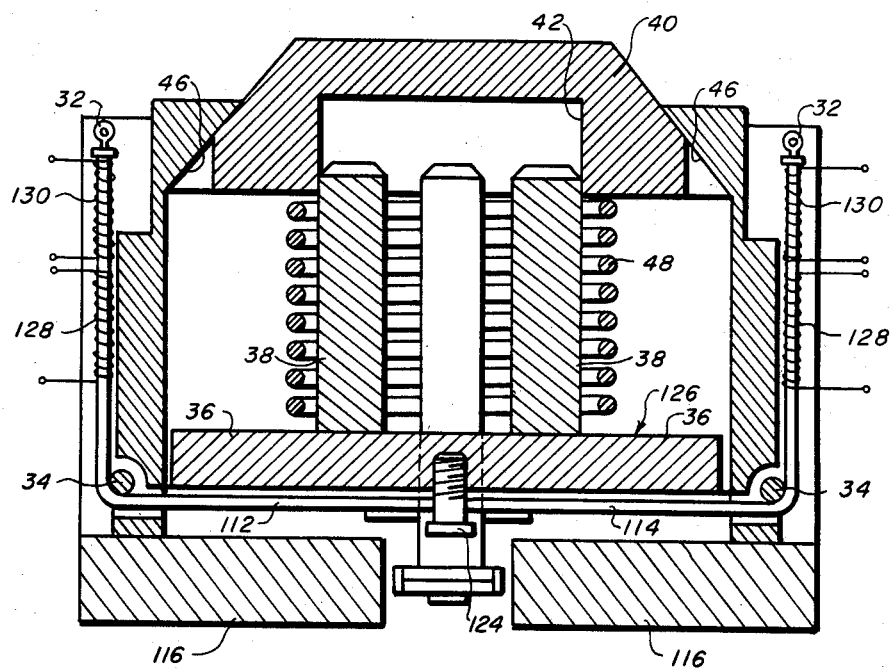
FIG. 2 is a cut away drawing of a torque sensor utilizing the principles shown in FIG. 1.

Referring now to FIG. 2 there is shown a torque sensor using the principles shown in FIG. 1 with like members having a numeral designation of a 1 in front of corresponding members. The magnetoelastic members 112 and 114 are secured at end attachments 32 to stationary housing members 116. As disclosed in FIG. 1, the magnetoelastic ribbon portions 112 and 114 can be segments of a continuous ribbon and are prestressed to improve linearity. Magnetoelastic ribbon portions 112, 114 are curvilinlearly disposed about bearings 34 which ideally should be frictionless and are secured to a stationary portion of the device, such as housing 116. Coils 128 and 130 are wrapped around a portion of the respective magnetoelastic ribbon portions 112, 114 and connected to appropriate circuitry as will be discussed more completely hereinafter.

Tensile and compression forces are applied magnetoelastic ribbon portions 112, 114 by torque coupling member 124 which in turn is coupled to torque receiving member generally designated 126. Torque receiving member 126 includes a support platform 36 upon which guide pillars 38 are secured. Coupling 124 is securely fastened to platform 36 for transmitting torque forces to magnetoelastic ribbon portions 112, 114. However, platform 36 itself can be in adjacent contact with portions of magnetoelastic ribbon portions 112, 114 for transmitting respective tensile and compressive forces to either respective approximate ribbon portions. Button 40 is guided by pillars 38 within cavity 42 with an outer rim 44 being positionally guided by surface 46 of housing 116. Return spring 48 coiled around pillars 38 provides the return motion for button 40 from movement by an applied torque by exerting forces for appropriate nesting of button 40 against surfaces 46 to center return coupling 124 to the quiescent position. In this case a tilting torque applied to button 40 will apply forces to the ribbons 112, 114. If button 40 is secured to pilars 38, then rotary forces applied to button 40 will also be transmitted to ribbons 112, 114 in which case a different return mechanism would have to be used.

Figure 3:
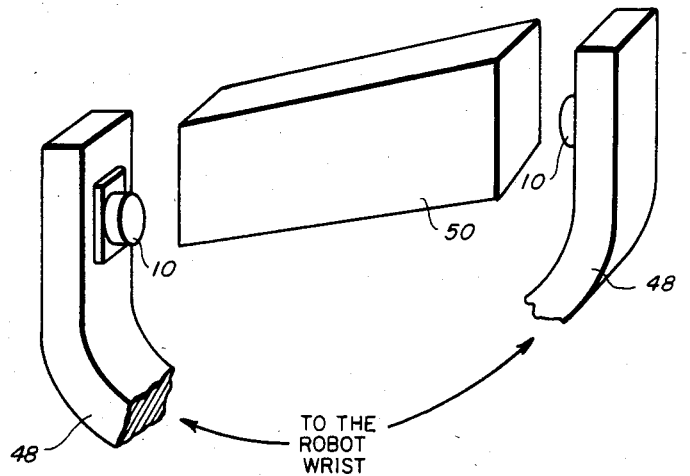
FIG. 3 is a representation of a robot wrist showing a typical placement of the strain gauge of FIGS. 1 and 2.

Referring now to FIG. 3 there is shown a robot wrist 48 upon which torque sensor 10 is mounted for engagement with an object 50 to be gripped by the wrist.

Figure 4:
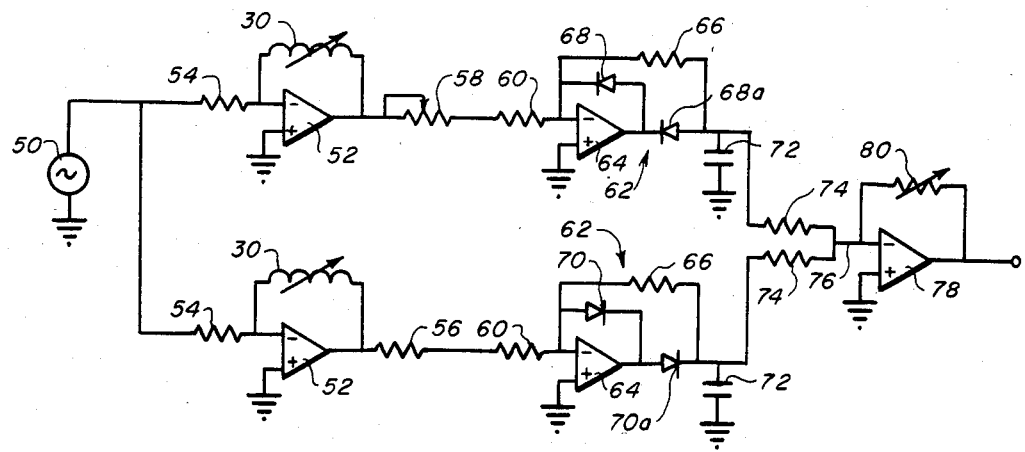
FIG. 4 is a schematic of the electronics for measuring the torque sensed by the gauge of the present invention.

Referring now to FIG. 4 there is shown a schematic of the electronics connected to coil 30. The input voltage (not shown) into coil 28 should be of sufficient intensity and frequency to generate a magnetic field to interact with the magnetoelastic ribbon. In the exemplary embodiment a frequency 10 kHz is used such that there is no skin effect. The frequency and intensity depends upon the physical structure of the coils of the ribbons with the winding of the coil around the ribbon such that the coupling is sufficient for such interaction. Also it should be kept in mind that the higher the frequency, the less penetration is accomplished with by the magnetic field with the ribbon and accordingly the sensitivity would probably be reduced. However there is an optimum sensitivity frequency in that a substantially lower frequency reduces the coupling, increasing the turns per volt required for an adequate magnetic field generation, and requires the coil to be wound with a larger number of turns. It is within the contemplation of the present invention that the coils need not be wound about the ribbon but can be flat coils in close proximity with the flat side of the ribbon for coupling a generated and sensed magnetic field to and from the ribbon.

The change of permeability is sensed at coil 30. The change of inductance due to stresses applied to the magnetoelastic ribbon portions as described hereinabove is sensed by operational amplifiers having the coil 30 in a feedback of an operational amplifier thus forming an integration circuit. In the exemplary embodiment, any transformer action between the coils 12, 14 is not utilized.

Referring now to FIG. 4, a signal source 50 is provided which can be of a suitable frequency not necessarily the excitation frequency into coil 30. The voltage output of amplifier 52 is proportional to the inductance and the inductance of coil 30 is proportional to the B field of the magnetoelastic ribbon which is changeable and dependent upon the forces within the ribbon as discussed hereinabove.

The output of amplifiers 52 are respectively fed through a resistor 56 in one leg and a variable resistor 58 in the other leg and through an isolation resistor 60 and peak detectors 62 of opposite sign to detect the difference between the output voltages of the two sides of the circuit. Operational amplifiers 64 are connected in each leg with feedback resistors 66 and feedback diodes 68, 68a and 70, 70a respectively for half way rectifying the output of the respective leg. Capacitors 72 connected from the output of each amplifier 64 to ground provide the peak detection and serve as low pass filter for filtering out noise and other extraneous signals. Isolation resistors 74 are connected at terminal 76 with the difference between the circuits being fed to operational amplifier 78 having feedback resistor 80 for adjusting the overall gain of the circuit.

In the exemplary embodiment a push-pull mode is used. If only one ribbon portion is used, then one of the operational amplifiers 52 is modified with an appropriate resistor in the feedback loop instead of a coil 30. In such a case, this leg then acts as a reference against which the active leg is measured against.

Thus there has been disclosed a torque gauge using magnetoelastic ribbons wherein changes the magnetic characteristics of these ribbons are detectable in a push-/pull mode for determining torque forces applied to the ribbons. The respective tensile and compressive forces applied to the ribbons cause a change in the magnetic qualities of the ribbons and of the inductance of coils wound about the ribbons, with the change of inductance being a measure of the torque forces applied to the input of the device.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and secured by Letters Patent of the United States is:

1. Apparatus for measuring torque forces applied to a member comprising:
a pair of elongated magnetoelastic means portions having one of the ends along the length of each joined to each other with the other respective end being secured to a stationary member, a torque transmission means connected between a rotatable member and the joined ends of the magnetoelastic means portions for transmitting torque forces applied to the rotatable member to the joined ends for applying tensile and compressive stress forces to the magnetoelastic means portions along the length, the tensile stress force and the compressive stress force changing the values of the magnetic characteristics of the respective magnetoelastic means portions, a first and second magnetic coupling means disposed in close proximity to each of the magnetoelastic means portions so that a magnetic field generatable by the first magnetic coupling means and penetrating the respective magnetoelastic means portions will cause changes in the generated magnetic field, the change of values of the generated magnetic field being detectable and measurable at the second magnetic coupling means for determining the amount of torque force applied to the rotatable member.

2. The apparatus of claim 1 wherein the first and second magnetic coupling means are coils wound about the respective magnetoelastic means portions, the first magnetic coupling means being impressible by electric current for generating the magnetic field interacting with the respective magnetoelastic means portions, the respective second coupling means receiving the effected magnetic field and connectable to external circuitry for measuring the amount of the effect on the magnetic field and correllating the amount of change in values of the magnetic field for measurement of torque applied to the rotatable member.

3. The apparatus of claim 2 further comprising a return spring for returning the rotatable member back to the original position after a torque force has been applied and removed from the rotatable member.

4. The apparatus of claim 2 wherein the magnetoelastic means portions are pretensioned along their respective length.

5. Apparatus for measuring torque forces applied to a robotic gripping hand comprising:
a housing disposed on a portion of the hand engagable with a gripped object, the housing having a first and second spaced apart ends along the length of the housing and defining a cavity inside the housing, the first end being open and adapted for engagement with the gripped object, the second end being adapted for securement to the hand surface,
a pair of elongated magnetoelastic means portions having one of the ends along the length of each joined to each other with the other end being secured to the housing,
a torque reception means disposed at the first end of the housing for receiving torques applied between the gripped object and the hand,
a torque transmission means connected between the torque reception means and the joinder of the magnetoelastic means portions for transmitting torque forces applied to the torque reception means for applying a tensile stress force to one of the magnetoelastic means portions along the length and a compressive stress force to the other one of the magnetoelastic means portions along the length, the tensile stress force and the compressive stress force hanging the values of the magnetic characteristics of the respective magnetoelastic means portions, and first and second magnetic coupling means disposed in close proximity to each of the magnetoelastic means portions so that a magnetic field generated by the first magnetic coupling means penetrating the respective magnetoelastic means portion and acted upon by the respective magnetoelastic means portion will cause a change of values of the magnetic characteristics of the respective magnetoelastic means portion, the change of values effected by the magnetic field being detectable and measureable at the second magnetic coupling means for determining the amount of torque force applied to the torque reception means.

6. The apparatus of claim 5 wherein the first and second magnetic coupling means are coils wound about the respective magnetoelastic means portion, the first magnetic coupling means being impressible by an electric current for generating the magnetic field interacting with the respective magnetoelastic means portion, the respective second coupling means receiving the effected magnetic field and correlating the amount of change of values of the magnetic field to measurement of torque applied to the torque receiving means.

7. The apparatus of claim 6 further comprising a return spring for returning the torque receiving means back to the original position after a torque force has been applied and removed from the torque receiving means.

8. The apparatus of claim 6 wherein the magnetoelastic means portions are pre-tensioned along their respective length.

9. The apparatus of claim 6 wherein the magnetoelastic means portions are disposed about the outerwall of the housing.

10. The apparatus of claim 6 wherein the housing is provided with bearing members and the magnetoelastic means portions are held curved from a straight longitudinal path against the bearing members at the bending points.

11. The apparatus of claim 6 wherein the magnetoelastic means portions are unitary and wherein the apparatus further comprises coupling means secured to the magnetoelastic means portions at the joinder between them, said coupling being connected to the torque receiving means for transferring torque generated forces to the magnetoelastic means portions.

* * * * *